United States Patent [19]
Gruender et al.

[11] Patent Number: 6,102,090
[45] Date of Patent: Aug. 15, 2000

[54] FLITCH TABLE MOUNTING

[75] Inventors: Hartmut Gruender, Bad Hersfeld, Germany; Juergen F. Trost; Daniel J. Rastatter, both of Beaver Falls, Pa.

[73] Assignee: Danzer North America, Inc., Wilmington, Del.

[21] Appl. No.: 09/328,081

[22] Filed: Jun. 8, 1999

Related U.S. Application Data

[60] Provisional application No. 60/097,305, Aug. 20, 1998.

[51] Int. Cl.[7] .......................................... B27C 1/00
[52] U.S. Cl. ......................... 144/178; 144/162.1; 144/214
[58] Field of Search ................................ 144/162.1, 178, 144/209.1, 211, 212, 24

[56] References Cited

U.S. PATENT DOCUMENTS

| | | |
|---|---|---|
| 2,576,520 | 11/1951 | Koss . |
| 2,676,627 | 4/1954 | McFall . |
| 3,441,069 | 4/1969 | Koss . |
| 3,654,973 | 4/1972 | Koss . |
| 3,680,612 | 8/1972 | Hale . |
| 3,750,725 | 8/1973 | Cremona . |
| 4,063,578 | 12/1977 | Cremona . |
| 4,068,693 | 1/1978 | Cremona . |
| 4,069,850 | 1/1978 | Cremona . |
| 4,083,391 | 4/1978 | Cremona . |
| 4,089,354 | 5/1978 | Cremona . |
| 5,680,887 | 10/1997 | Brand ....................................... 144/178 |

*Primary Examiner*—W. Donald Bray
*Attorney, Agent, or Firm*—Barnes & Thornburg

[57] ABSTRACT

A veneer slicer comprises a frame and a flitch table for supporting a flitch for the slicing of veneer therefrom. The flitch table is supported from the frame. The veneer slicer further comprises a knife. The flitch table and knife are relatively movable along a path toward and away from one another. The flitch table is mounted on the frame for movement of the flitch across the knife in cutting and return strokes. The flitch table is supported from the frame by a guide member secured to one of the flitch table and the frame and a bearing member secured to the other of the flitch table and the frame for cooperation with the guide member. The guide member and bearing member form between them at least one channel for a plurality of bearings.

17 Claims, 5 Drawing Sheets

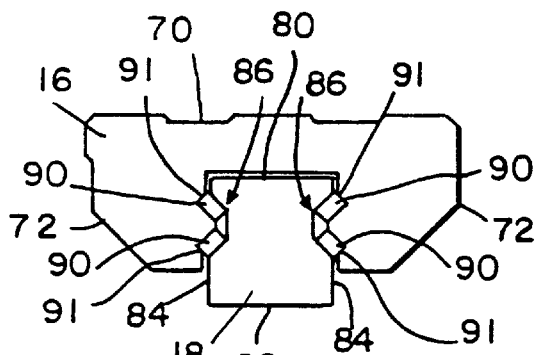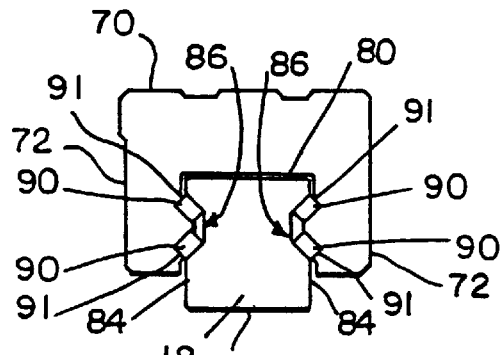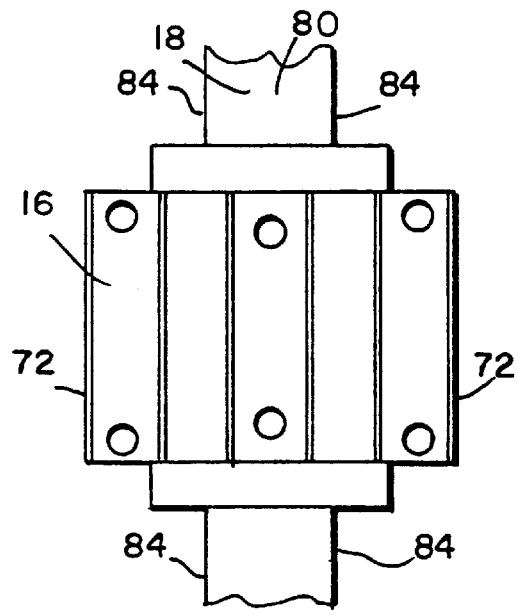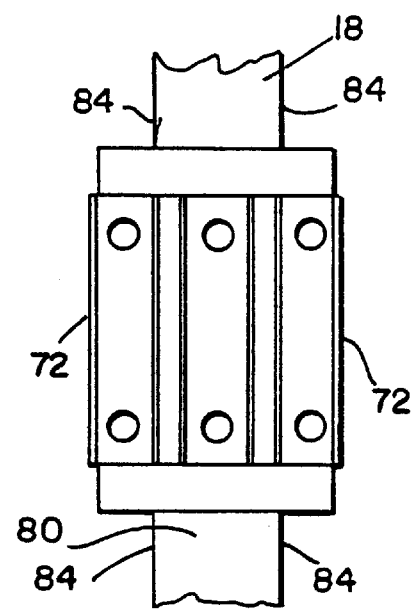

FLITCH TABLE MOUNTING

This application claims benefit of Provisional Application Ser. No. 60/097,305 filed Aug. 20, 1998.

TECHNICAL FIELD

This invention relates to veneer slicers.

BACKGROUND ART

Various types of veneer slicers are known. There are, for example, the veneer slicers illustrated and described in the following U.S. Pat. Nos. 2,576,520; 2,676,627; 3,441,069; 3,654,973; 3,680,612; 4,063,578; 4,068,693; 4,069,850; 4,083,391; 4,089,354; 4,102,372; 4,137,957; 4,503,896; 4,587,616; 4,601,317; 5,381,841; 5,511,598; 5,562,137; and, 5,590,700: Canadian Patent 1,204,985: and German Patent Specifications: 2,501,936; and, 2,523,481. There are also the disclosures of U.S. Pat. Nos. 4,392,519; 4,503,740; 4,831,747; 4,893,663; 5,067,534; 5,101,874; 5,143,129; 5,383,504; and, 5,490,548: German Patent Specifications: 2,523,482; 3,915,516; and, 3,928,941: and, Italian Patent Specifications: 1,084,683; and, 1,126,371. No representation is intended by this listing that an exhaustive search of all pertinent prior art has been made or that no better art than that listed exists, and no such representation should be inferred. This listing does not constitute a representation that the material listed is pertinent, and no such representation should be inferred.

DISCLOSURE OF THE INVENTION

According to the invention, a veneer slicer comprises a frame and a flitch table for supporting a fitch for the slicing of veneer therefrom. The fitch table is supported from the frame. The veneer slicer further comprises a knife. The fitch table and knife are relatively movable along a path toward and away from one another. The flitch table is mounted on the frame for movement of the flitch across the knife in cutting and return strokes. The fitch table is supported from the frame by a guide member secured to one of the fitch table and the frame and a bearing member secured to the other of the flitch table and the frame for cooperation with the guide member. The guide member and bearing member form between them at least one channel for a plurality of bearings. The bearings are movable relative to the bearing member and the guide member.

Illustratively according to the invention, the guide member comprises a plurality of guide rails secured to one of the frame and flitch table. The bearing member comprises a plurality of bearing carriages secured to the other of the frame and fitch table for cooperation with each of the guide rails. Each bearing carriage and an associated guide rail form at least one of said channels.

Further illustratively according to the invention, the bearings are roller bearings.

Alternatively illustratively according to the invention, the bearings are ball bearings.

Illustratively according to the invention, at least one of the guide member and bearing member defines at least one circulating channel for the ball or roller bearings.

Additionally illustratively according to the invention, the stroke of the flitch table during which the knife assembly is in contact with the fitch to cut a slice of veneer from the flitch is an upward stroke.

Alternatively illustratively according to the invention, the stroke of the flitch table during which the knife assembly is in contact with the flitch to cut a slice of veneer from the flitch is a downward stroke.

BRIEF DESCRIPTION OF THE DRAWINGS

The invention may best be understood by referring to the following description and accompanying drawings which illustrate the invention. In the drawings:

FIG. 6 illustrates a plan view of a detail of the system illustrated in FIGS. 1–3;

FIG. 7 illustrates an elevational view of a detail of the system illustrated in FIGS. 1–3;

FIG. 8 illustrates a plan view of an alternative detail to the detail illustrated in FIGS. 6–7;

FIG. 9 illustrates an elevational view of the detail illustrated in FIG. 8; and

MODES FOR CARRYING OUT THE INVENTION

Figure 1:
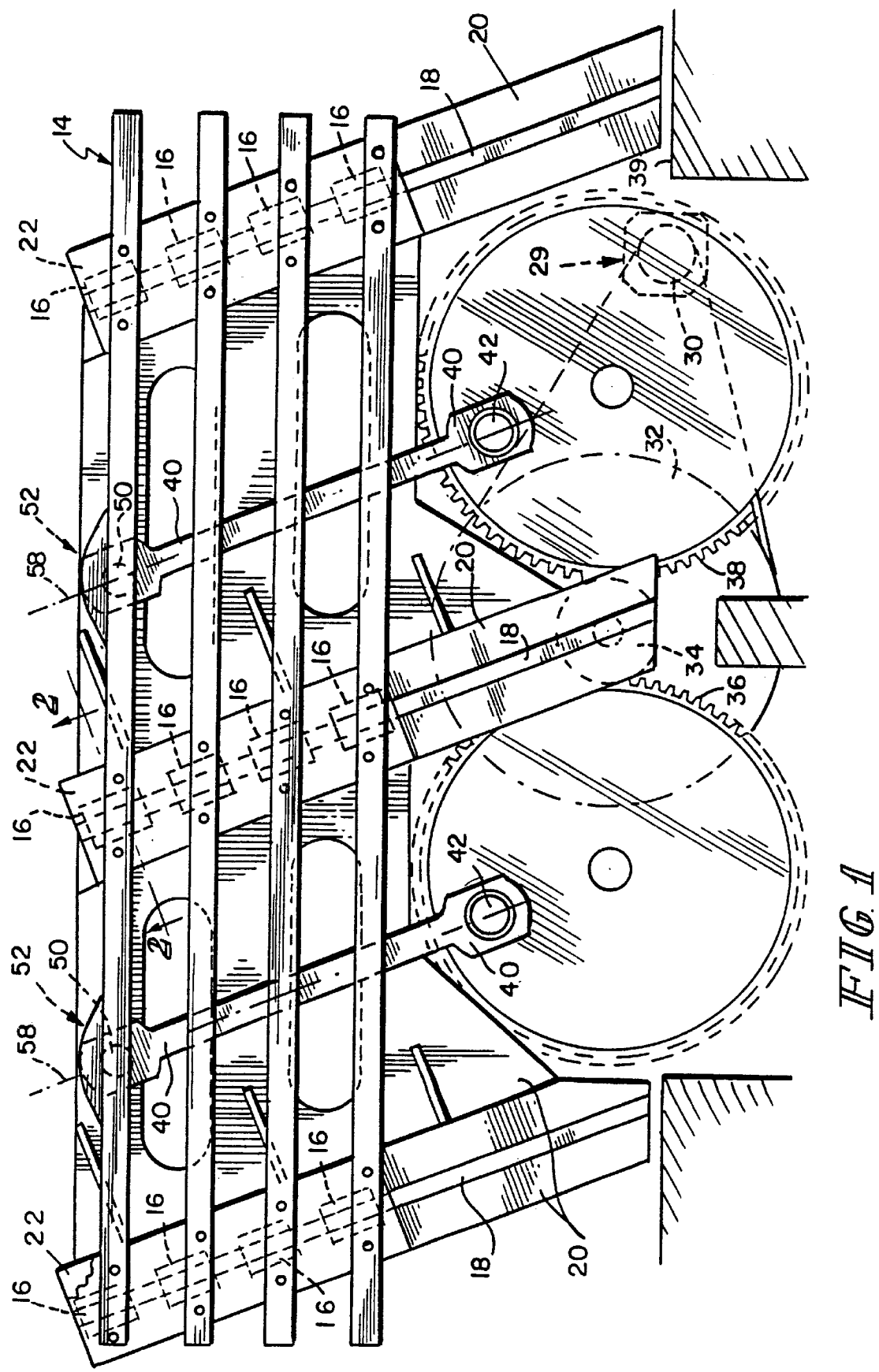
FIG. 1 illustrates a partially fragmentary, phantom front elevational view of a flitch table and reciprocating mechanism for a veneer slicer according to the invention.
Figure 2:
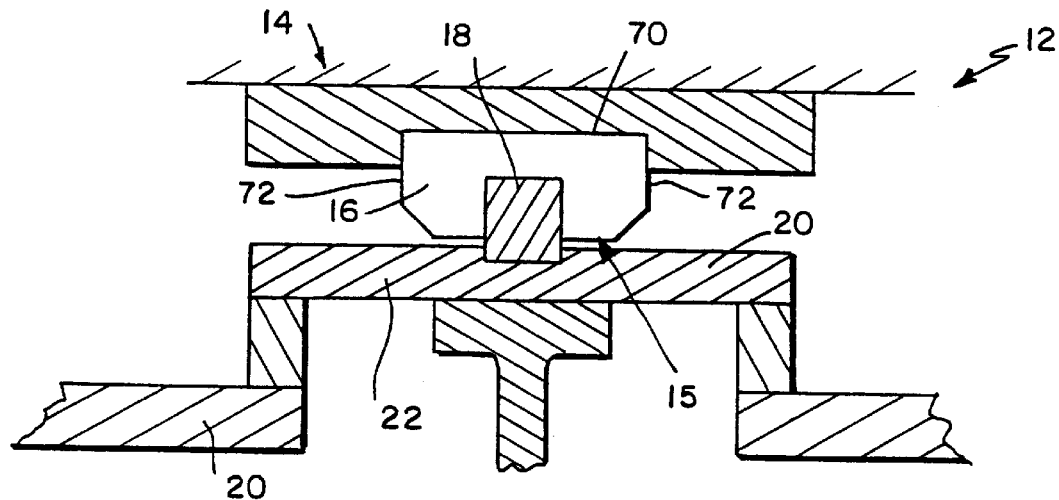
FIG. 2 illustrates a fragmentary sectional view of the fitch table and reciprocating mechanism illustrated in FIG. 1, taken generally along section lines 2—2 of FIG. 1.

A veneer slicer of the type described in certain of the above-identified patents, or in U.S. Ser. No. 09/096,308 filed Jun. 11, 1998 titled VENEER SLICER and assigned to the same assignee as this application, is provided for slicing veneer (not shown) from a flitch 11 best illustrated in FIG. 3. The disclosure of U.S. Ser. No. 09/096,308 is incorporated herein by reference as a teaching of an illustrative veneer slicer mechanism. The flitch 11 is mounted upon the flitch table mounting system 12 for generally up-and-down reciprocating movement relative to a knife bar mounting system 13. The reciprocating movement of the flitch table mounting system 12, combined with stepwise movement of the knife bar mounting system 13 toward the flitch table mounting system 12 causes veneer to be cut from the flitch 11.

The flitch table mounting system 12 according to the present invention includes a flitch table 14 on the back side (side facing away from the knife bar mounting system 13) of which are mounted multiple linear bearings 16 best illustrated in FIGS. 1–2 and 6–7 of linear motion systems 15. The linear motion systems 15 additionally include guide rails 18 supported on an adapter frame 20, best illustrated in FIG. 2. Mounting all of the guide rails 18 on a common support such as frame 20 makes maintaining parallel relationships among the guide rails 18 more straightforward. The adapter frame 20 includes multiple vertical supports 22 which support the guide rails 18.

Referring now to FIG. 1, a motor 29 works through a transmission including a drive pulley 30 and a driven pulley 32. A drive gear 34 is coupled to driven pulley 32. Drive gear 34 engages first and second driven gears 36, 38. The relative circumferences and/or numbers of teeth on the various pulleys and gears 30, 32, 34, 36, 38 reduce the rotation frequency from that of the motor 29 to the desired reciprocation frequency of table 12. For convenience, driven gears 36, 38 are positioned to lie partially above a floor level 39 and partially below the floor level 39.

First and second connecting rods 40 are pivotally coupled to driven gears 36, 38 at points 42. Wrist pins 50 pivotally couple the connecting rods 40 to the flitch table 14 at points 52 near the upper extent of the flitch table 14.

As the first and second driven gears 36, 38 are rotated, their rotation is converted to reciprocation of the flitch table 14 by the connections of the connecting rods 40 and wrist pins 50. The flitch table 14 is mounted for reciprocation by linear motion mechanisms 15. Each linear motion mechanism 15 includes linear bearings 16 mounted on respective ones of the three guide rails 18 in order to guide the flitch table 14 to reciprocate along a line of motion 58. In the embodiment illustrated in Fig. 1, there are three guide rails 18 and three or four linear bearings 16 are mounted on each guide rail 18. It is well within the scope of the invention to include a flitch table mounting system having any suitable number of linear bearings 16 mounted to any suitable number of guide rails 18.

With reference to FIGS. 6–9, in the illustrated embodiments each linear bearing 16 is formed to include a back wall 70 for mounting on the flitch table 14 and two sides 72. As best illustrated in FIGS. 4, 5, 6, and 8, the guide rails 18 are formed to include a top surface 80, a bottom surface 82, and two opposite side surfaces 84. Each side surface 84 is formed to include a groove or channel 86 therein, as illustrated in FIGS. 4, 5, 6, and 8. Sides 72 of linear bearings 16 are formed to be received within respective channels 86 formed in each side surface 84 of the guide rails 18. Illustratively, circulating roller bearings 90 are provided between the sides 72 of linear bearings 16 and the facing surfaces of each channel 86 of guide rails 18. The roller bearings 90 circulate in respective galleries 91 provided for circulation of the bearings 90 in linear bearings 16. Illustratively, linear bearings 16 may be Schneeberger Linear Technology type MRB 65 linear bearings. Of course, ball bearings or sliding bushings can be provided in place of roller bearings 90. If ball- or roller bearings are used in the linear motion systems 15, the bearings may be circulating, as illustrated, or non-circulating. Similarly, ball- or roller bearings, whether circulating or non-circulating, may be mounted on the rails 18 rather than on the linear bearings 16.

Figure 3:
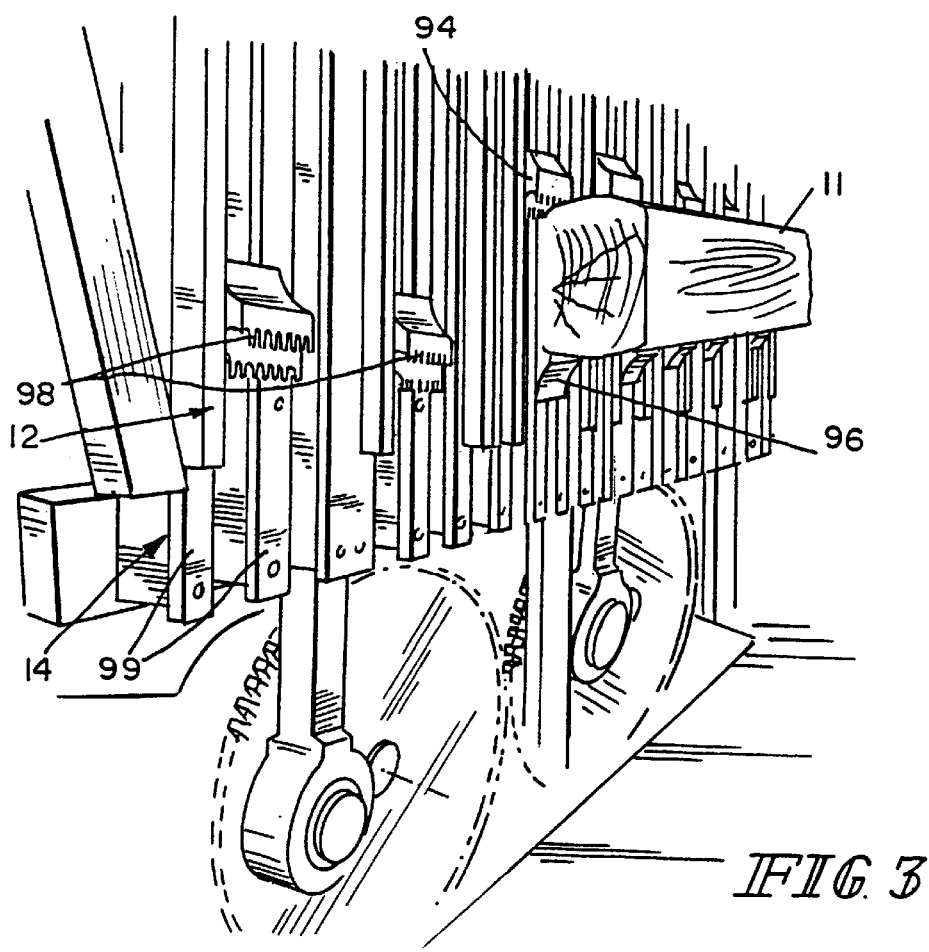
FIG. 3 illustrates a front perspective view of a portion of the flitch table and reciprocating mechanism with a flitch mounted to the flitch table by upper and lower dogs positioned to grip the flitch.
Figure 4:
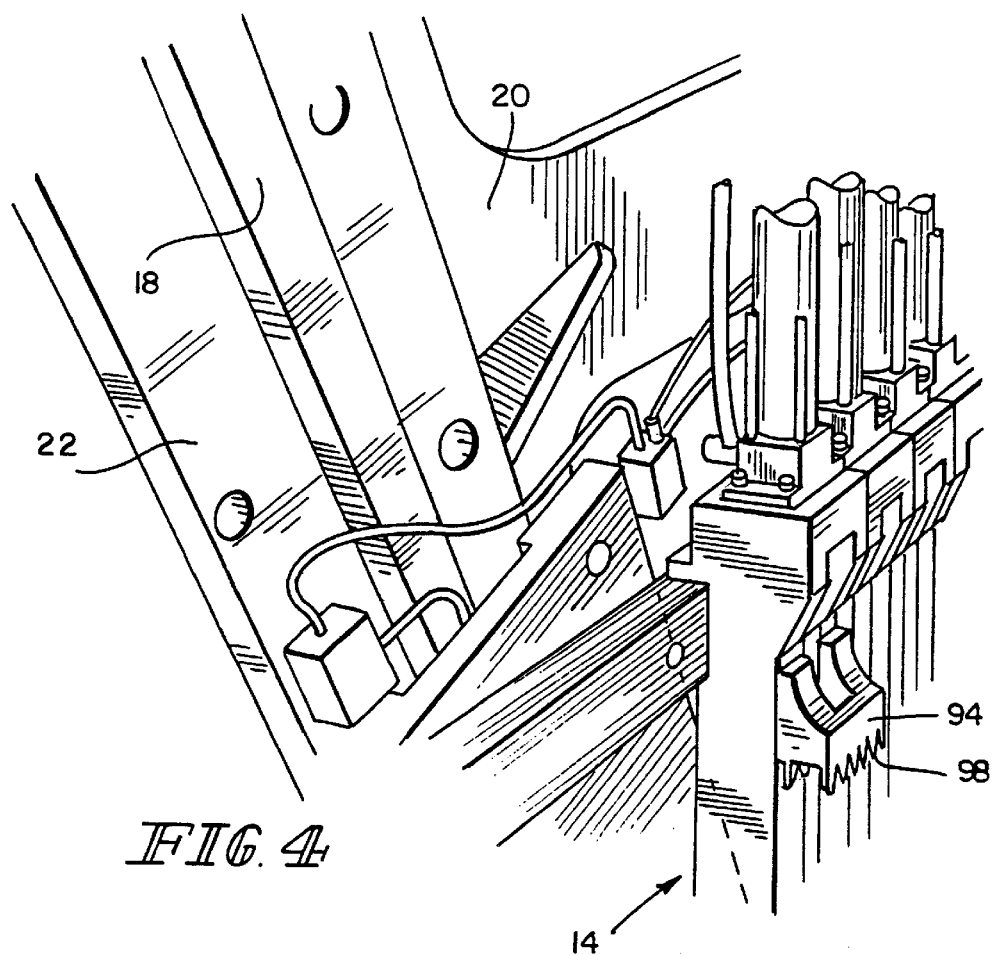
FIG. 4 illustrates a perspective view of a detail of the system illustrated in FIGS. 1–3.
Figure 5:
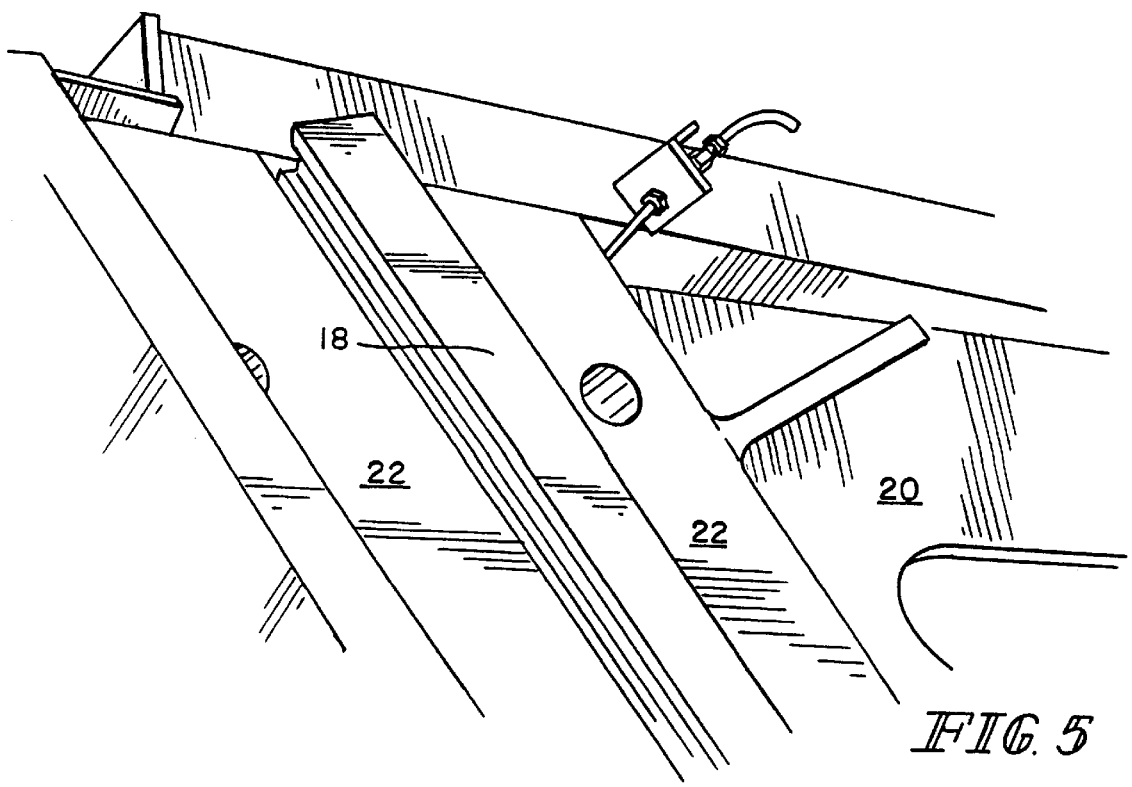
FIG. 5 illustrates another perspective view of a detail of the system illustrated in FIGS. 1–3.

Referring now to FIG. 3, the flitch 11 is illustrated mounted upon the flitch table 14. The flitch 11 is supported by upper and lower dogs 94, 96, respectively. Both the upper and lower dogs 94, 96 are formed to include teeth 98 for gripping the flitch 11. The upper and lower dogs 94, 96 are hydraulically movable along rails 99 in order to grip the flitch 11 securely as the fitch table 14 and flitch 11 are reciprocated past a knife 100 mounted on the knife bar mounting system 13 in order to slice veneer from the flitch 11. Other dogging mechanisms, such as one of the general type illustrated and described in, for example, U.S. Pat. No. 5,150,746, or of any other suitable configuration, may be used instead of, or in combination with, those illustrated in the drawings.

Figure 10:
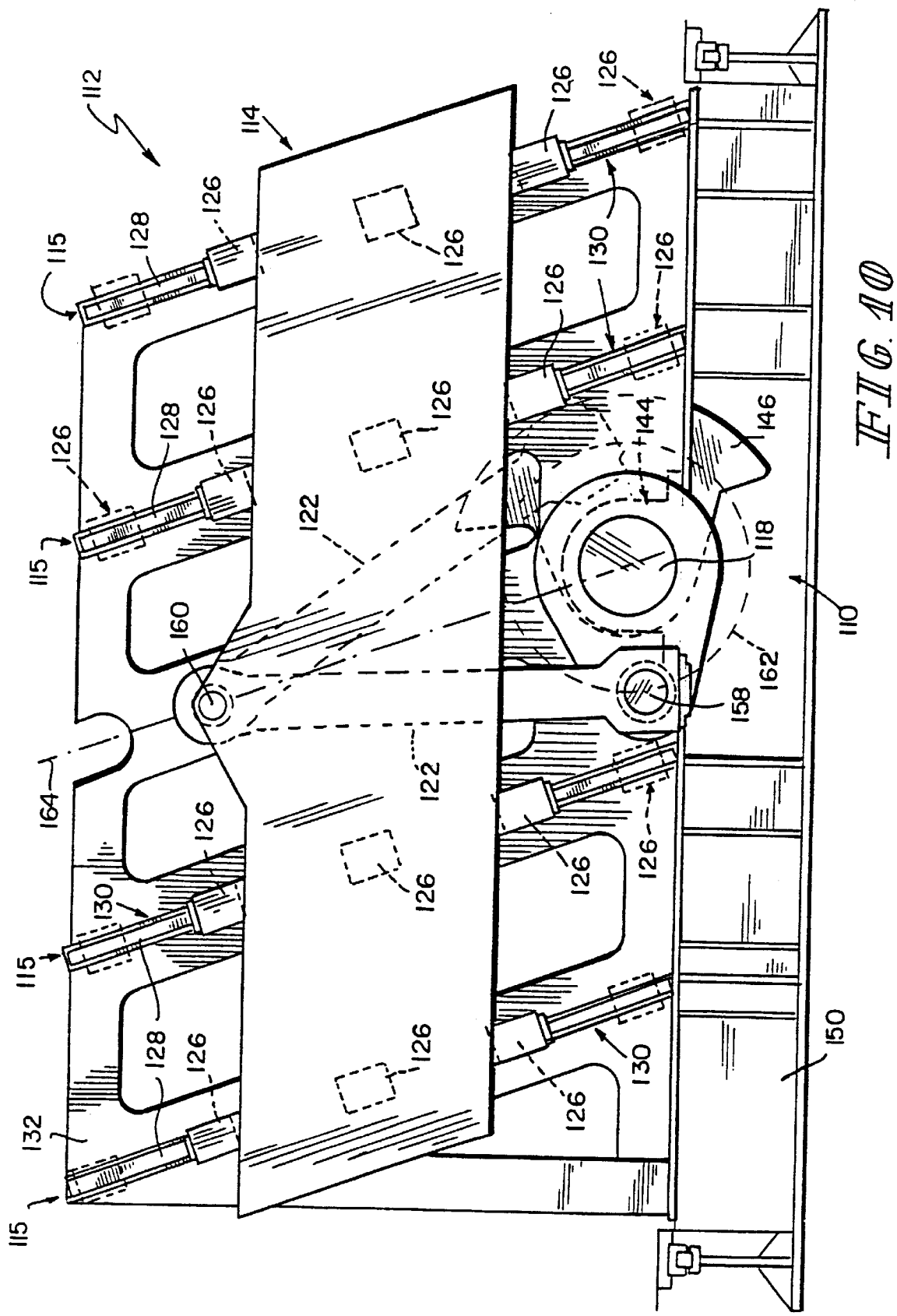
FIG. 10 illustrates a partially fragmentary, phantom front elevational view of another flitch table and reciprocating mechanism for a veneer slicer according to the invention.

Another embodiment illustrated in FIG. 10 includes a flitch table mounting system which is driven by a single gear 36, rather than by the first and second driven gears 36, 38 of the flitch table mounting system 12. The rotation of gear 36 is converted to reciprocation of the flitch table 14 by the connection of one connecting rod 40, illustrated in two of its positions, and wrist pin 50. The flitch table 14 is mounted for reciprocation from any suitable number of linear motion systems 15 including linear bearings of the general configuration of linear bearings 16, or any other suitable configuration, from any suitable number of guide rails having the general configuration of guide rails 18, or any other suitable configuration.

What is claimed is:

1. In a veneer slicer comprising a frame, a flitch table for supporting a flitch for the slicing of veneer therefrom, the flitch table supported from the frame, a knife, the fitch table and knife being relatively movable along a path toward and away from one another, the flitch table being mounted on the frame for movement of the flitch across the knife in cutting and return strokes, the fitch table supported from the frame by a guide member secured to one of the flitch table and the frame and a bearing member secured to the other of the flitch table and the frame for cooperation with the guide member, the guide member and bearing member forming between them at least one channel, and a plurality of bearings within the channel.

2. The apparatus of claim 1 wherein the bearings are roller bearings.

3. The mounting apparatus of claim 2 wherein at least one of the guide member and bearing member defines at least one circulating channel for the roller bearings.

4. The mounting apparatus of claim 1 wherein the bearings are ball bearings.

5. The mounting apparatus of claim 4 wherein at least one of the guide member and bearing member defines at least one circulating channel for the ball bearings.

6. The mounting apparatus of claim 1 wherein the guide member comprises a plurality of guide rails secured to one of the frame and flitch table, the bearing member comprises a plurality of bearing carriages secured to the other of the frame and flitch table for cooperation with each of the guide rails, each bearing carriage and an associated guide rail forming at least one of said channels.

7. The apparatus of claim 6 wherein the guide rails are oriented at an angle greater than or equal to zero degrees from vertical and less than or equal to forty-five degrees from vertical.

8. The apparatus of claim 6 wherein the bearings are roller bearings.

9. The apparatus of claim 8 wherein at least one of the guide member and bearing member defines at least one circulating channel for the roller bearings.

10. The apparatus of claim 6 wherein the bearings are ball bearings.

11. The apparatus of claim 10 wherein at least one of the guide member and bearing member defines at least one circulating channel for the ball bearings.

12. The apparatus of claim 7 wherein the bearings are roller bearings.

13. The apparatus of claim 12 wherein at least one of the guide member and bearing member defines at least one circulating channel for the roller bearings.

14. The apparatus of claim 7 wherein the bearings are ball bearings.

15. The apparatus of claim 14 wherein at least one of the guide member and bearing member defines at least one circulating channel for the ball bearings.

16. The apparatus of claim 1, 2, 3, 4, 5, 6, 7, 8, 9, 10, 11, 12, 13, 14 or 15 wherein the stroke of the flitch table during which the knife assembly is in contact with the flitch to cut a slice of veneer from the flitch is an upward stroke.

17. The apparatus of claim 1, 2, 3, 4, 5, 6, 7, 8, 9, 10, 11, 12, 13, 14 or 15 wherein the stroke of the flitch table during which the knife assembly is in contact with the flitch to cut a slice of veneer from the flitch is a downward stroke.

\* \* \* \* \*